(12) United States Patent
Fankhauser et al.

(10) Patent No.: US 9,256,656 B2
(45) Date of Patent: Feb. 9, 2016

(54) DETERMINING RELIABILITY OF DATA REPORTS

(71) Applicant: International Business Machines Corporation, Armonk, NY (US)

(72) Inventors: Michael Fankhauser, DN Karkur (IL); Benjamin Halberstadt, Jerusalem (IL); Roger Hecker, Efrat (IL); Ilan Prager, Beit Shemesh (IL); Erel Sharf, Modiin (IL)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 13/970,725

(22) Filed: Aug. 20, 2013

(65) Prior Publication Data

US 2015/0058278 A1    Feb. 26, 2015

(51) Int. Cl.
*G06F 17/30* (2006.01)

(52) U.S. Cl.
CPC ............................... *G06F 17/30563* (2013.01)

(58) Field of Classification Search
CPC combination set(s) only.
See application file for complete search history.

(56) References Cited

U.S. PATENT DOCUMENTS

| | | | |
|---|---|---|---|
| 7,899,757 B1 | 3/2011 | Talan et al. | |
| 8,010,426 B2 | 8/2011 | Kopp et al. | |
| 8,099,383 B2 | 1/2012 | Naibo et al. | |
| 8,108,330 B2 | 1/2012 | Li et al. | |
| 8,126,820 B1 | 2/2012 | Talan et al. | |
| 8,290,960 B2 | 10/2012 | Li et al. | |
| 8,443,189 B2 | 5/2013 | Li et al. | |
| 2004/0138933 A1* | 7/2004 | LaComb et al. | 705/7 |
| 2006/0212931 A1* | 9/2006 | Shull et al. | 726/10 |
| 2007/0016669 A1* | 1/2007 | Butler | 709/224 |
| 2007/0255574 A1 | 11/2007 | Polo-Malouvier et al. | |
| 2009/0063534 A1 | 3/2009 | Halberstadt | |
| 2010/0106558 A1 | 4/2010 | Li et al. | |

OTHER PUBLICATIONS

Bonatti et al, "Robust and scalable linked data reasoning incorporating provenance and trust annotations", Journal of Web Semantics, vol. 9, Issue 2, pp. 165-201, Elsevier, Jul. 2011.; 64 pages.

Browne, "IBM Cognos Business Intelligence v10.1: Intelligence Unleashed", IBM Corporation Red Guides for Business Leaders, 2010; 26 pages.

Nagy, "Probabilistic Methods of Data Integration in a Multi-Agent Query Answering System", Feb. 2006. Can be found at : http://kmi.open.ac.uk/publications/pdf/kmi-tr-06-08.pdf.; 91 pages.

* cited by examiner

*Primary Examiner* — Etienne Leroux
(74) *Attorney, Agent, or Firm* — Cantor Colburn LLP

(57) ABSTRACT

A computer implemented system for automatically determining a reliability score of a data report. The system includes a data structure indicative of data lineage that includes data assets flowing into a data report. The system further includes a processor configured to calculate trust scores for data assets based on characteristics of the data assets as well as a data report trust density score indicative of the reliability score of the report based on the calculated trust scores. The system further includes an output device configured to output the calculated data report trust density score.

17 Claims, 7 Drawing Sheets

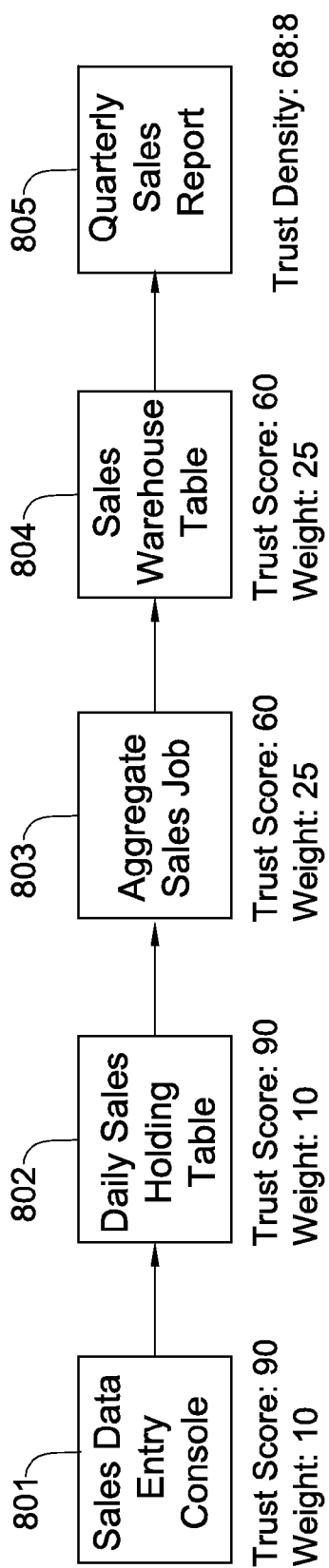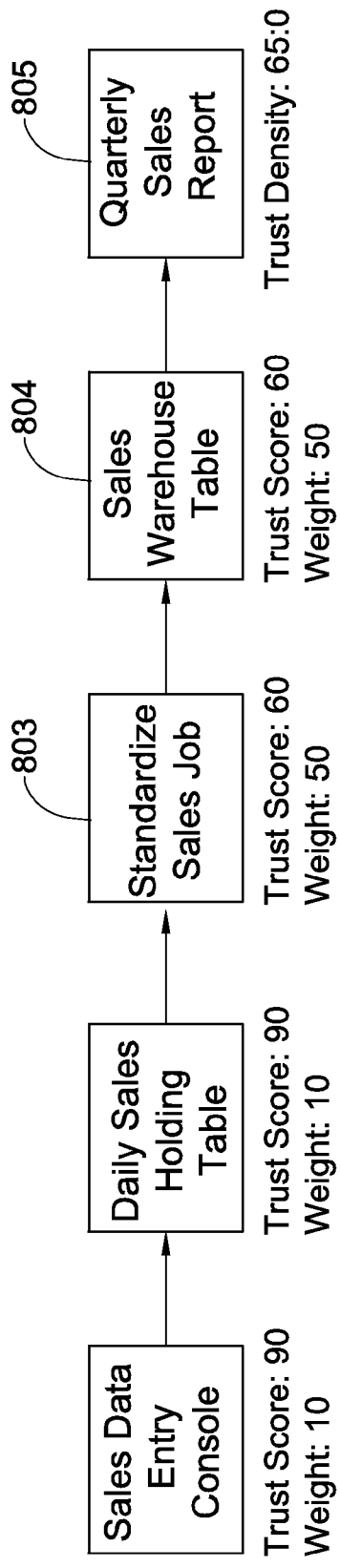
Fig. 8A
Fig. 8B

_(54)_ DETERMINING RELIABILITY OF DATA REPORTS

BACKGROUND

The present disclosure relates generally to business intelligence and, more particularly, to determining reliability of data reports.

Most large enterprises invest in a data warehouse to consolidate critical data. Such a data warehouse is used to facilitate reporting, analysis and decision making systems. The data warehouse is fed from the operational systems of the enterprise which are used to process day-to-day transactions. Once in the data warehouse, the information will then be moved to domain-specific data marts and will be available from there for analytical reporting. The reports help the enterprise and external regulators to see trends, risk exposure, data, etc.

The extraction of data from operational systems and its placement into the data warehouse is usually done using an Extract, Transform and Load (ETL) tool, an example of such a tool being IBM® InfoSphere® DataStage®. The movement of data from the warehouse to a data mart is done with a similar tool. The reports are designed and run using a data reporting tool, an example of such a tool being IBM® Cognos® Enterprise.

In certain scenarios, developing the warehouse, populating it, moving the data to a mart and then creating the necessary reports is a large and complex project. In many cases, dozens of developers are needed to develop, test and maintain the ETL code that is needed to produce the final reports. Also associated with the project are analysts, data stewards, data modelers, enterprise architects and project managers. These, combined with the ETL and other developers, result in very large teams that are dedicated to the reporting project.

The flow and transformation of information from the operational systems to the reports via the warehouse and marts is very complex. The data may flow through reporting layers, OLAP layers, data marts, data warehouses, staging databases, intermediate files, file transfers, ETL processes and operational data stores. Within the enterprise no single person may be able to understand this flow in its entirety.

Consider a report that needs to be delivered to government regulators: the enterprise needs to provide associated information that convinces the regulators that the results are indeed accurate and reliable. Since no single person may understand the data flow in its entirety, it is exceedingly challenging for an enterprise to validate the entire data flow and therefore the report's accuracy and reliability. It requires validating every step of the data lifecycle, including, verifying that the ETL code is moving and transforming the data as designed, verifying that the code is accessing and aggregating the data as designed, and verifying that the data sources used throughout the flow do not have any quality issues.

Accordingly, data quality issues reduce the reliability of reports and every enterprise has data quality issues to some extent. Decision-makers reading the reports need to know how reliable the report data is.

SUMMARY

According to an embodiment, a computer implemented system for automatically determining a reliability score of a final data source is provided. The system includes a data structure indicative of a data lineage that includes data assets flowing into a final data source, and a processor configured to calculate at least: trust scores for data assets based on characteristics of the data assets; and a final data source trust density score indicative of the reliability score of the final data source based on at least the calculated trust scores. The system also includes an output device configured to output the calculated final data source trust density score.

According to another embodiment, a computer implemented method for automatically determining a reliability score of a final data source is provided. The method includes providing a data structure indicative of a data lineage that includes data assets flowing into a final data source, calculating trust scores for data assets based on characteristics of the data assets, calculating a final data source trust density score indicative of the reliability score of the final data source based on at least the calculated trust scores, and outputting to an output device the calculated final data source trust density score.

According to a further embodiment, a computer program product is provided. The computer program product includes a computer readable medium embodying a computer program that includes a computer code portion for providing a data structure indicative of a data lineage that includes data assets flowing into a final data source, a computer code portion for calculating trust scores for data assets based on characteristics of the data assets, a computer code portion for calculating final data source trust density score indicative of the reliability score of the final data source based on at least the calculated trust scores, and a computer code portion for outputting to an output device the calculated final data source trust density score.

BRIEF DESCRIPTION OF THE SEVERAL VIEWS OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 8A-B illustrate two respective scenarios of data source reliability calculations.

DETAILED DESCRIPTION

Figure 1:
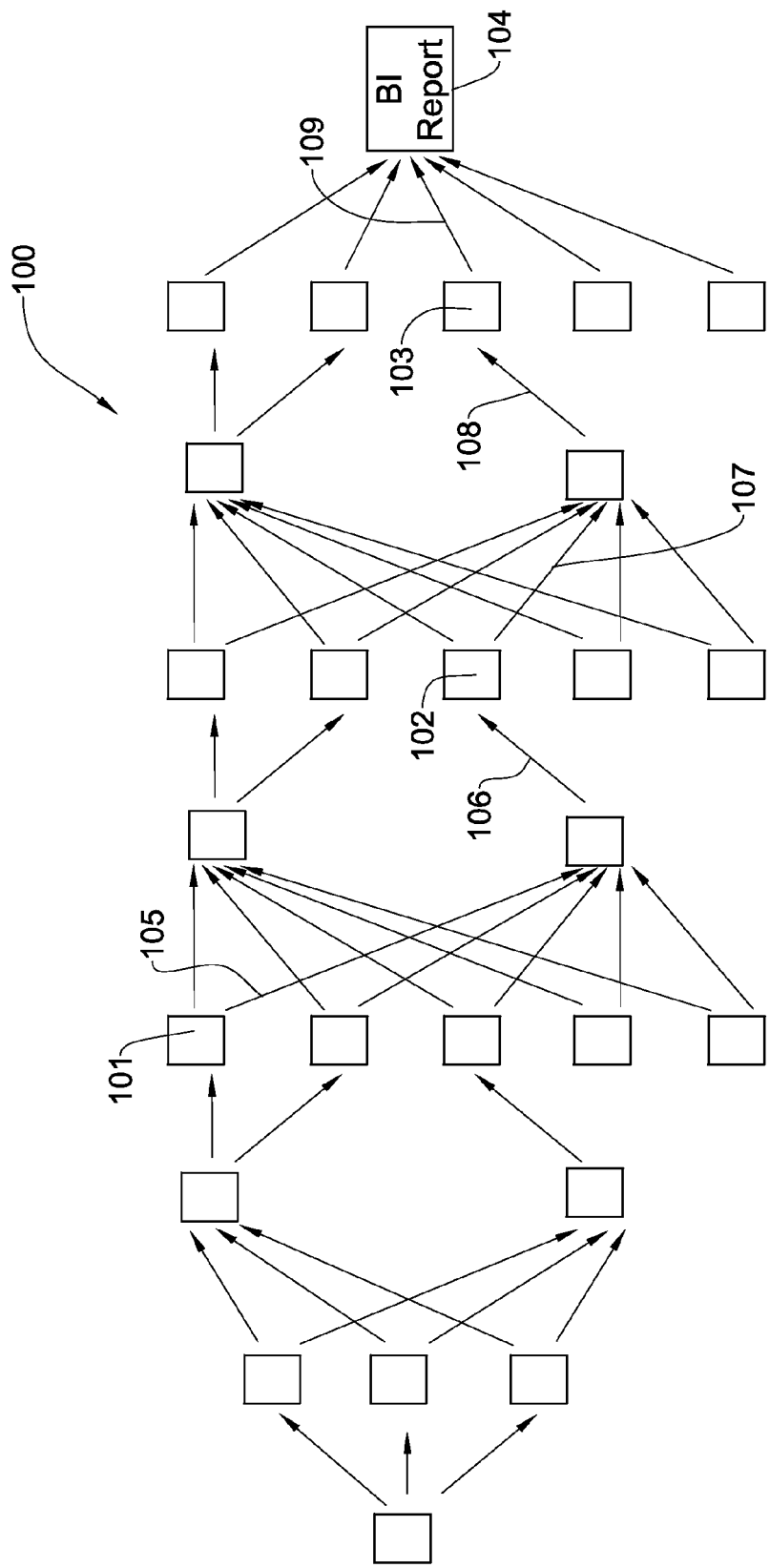
FIG. 1 illustrates an exemplary data lineage graph accessible by a system in accordance with certain embodiments of the invention.

In the following detailed description, numerous specific details are set forth in order to provide a thorough understanding of the disclosure. However, it will be understood by those skilled in the art that the present disclosure may be practiced without these specific details. In other instances, well-known methods, procedures, and components have not been described in detail so as not to obscure the present disclosure.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "processing", "calculating", "computing", "determining", "generating", "setting", "configuring", "selecting", "defining", "adding", "outputting" or the like, include action and/or processes of a computer that manipulate and/or transform data into other data, the data represented as physical quantities, e.g., such as electronic quantities, and/or the data representing the physical objects.

As used herein, the phrase "for example," "such as", "for instance" and variants thereof describe non-limiting embodiments of the presently disclosed subject matter.

It is appreciated that certain features of the presently disclosed subject matter, which are, for clarity, described in the context of separate embodiments, may also be provided in combination in a single embodiment or with other embodiment(s). Conversely, various features of the presently disclosed subject matter, which are, for brevity, described in the context of a single embodiment, may also be provided separately or in any suitable sub-combination.

In embodiments of the presently disclosed subject matter one or more stages illustrated in the figures may be executed in a different order and/or one or more groups of stages may be executed simultaneously and vice versa. The figures illustrate a general schematic of the system architecture in accordance with an embodiment of the presently disclosed subject matter. Each module in the figures can be made up of any combination of software, hardware and/or firmware that performs the functions as defined and explained herein. The modules in the figures may be centralized in one location or dispersed over more than one location.

Bearing this in mind, attention is drawn to FIG. 1 illustrating an exemplary data lineage graph 100 accessible by a system in accordance with certain embodiments of the invention. The boxes (e.g., 101, 102, 103) represent data sources that hold the data as it travels from the operational system to the data report 104. For example, these data sources could be at least one of: table(s) in the warehouse, data mart, staging database, intermediate file(s) used to extract data from one system in order to import to another, OLAP layer(s), operational and data store. Note that data sources are not bound by these particular examples.

The arrows (e.g., 105 to 109) represent the data routines that read the data from one source and write it to another. An arrow could be for example at least one of a DataStage ETL job/process, (FTP) file transfer(s) or any other such process that moves and/or transforms data. Note that data routines are not bound by these particular examples.

The ultimate reliability of the data report is a function of the trustworthiness of all these boxes and lines (data sources and data routines). Note that the specified data sources and data routines are examples of data assets which constitute the data lineage data structure (e.g., graph).

In accordance with various embodiments described below, the trust score of each data assert is calculated and a weight is assigned thereto (being a representative example of the complexity extent of the data asset), and then a Truth Density is calculated (based on at least the calculated trust scores) for obtaining an overall reliability score of the output data report.

Those versed in the art will readily appreciate that the data lineage graph of FIG. 1 is a non-limiting example of a data lineage data structure. By this example, data assets of the lineage graph include data sources and data routines. Each data source storing data traversing from source system(s) to the report (being an example of final data source), the data routines being representative, each, of data flowing from at least one data source to an at least one target data source or into the data report. Note that while for clarity of explanation the outcome is a data report, this is only an example of a final data source. Other non-limiting examples of final data sources (other than data reports) are, for instance, data files such as an XML data file, an Excel spreadsheet or a web service.

The embodiments are by no means bound, neither to the specific graph representation of FIG. 1, nor to a graph data structure. Note that a non-limiting manner of automatic generation of a data lineage in accordance with certain embodiments is described in U.S. Publication Number 2009/0063534 entitled "Data Lineage in Data Warehousing Environment", commonly assigned, and which content is incorporated herein by reference.

Note that in accordance with certain embodiments, where the output of the Lineage graph is a Data report, it may be for instance a Business Intelligence (BI) related report. The embodiments are not bound by this example and accordingly other examples are medical test results or federal safety regulation compliance reports.

In accordance with certain embodiments, in order to construct a data lineage (e.g., a data lineage graph of FIG. 1) an IBM InfoSphere Metadata Workbench calculates the data lineage results by examining the data integration metadata held in the InfoSphere metadata repository. It examines the ETL jobs, ETL logs, data source structures, data report details and any other such information that sheds light on the data lineage flow. Note that in accordance with certain embodiments, each data asset in the data lineage result necessarily exists in the metadata repository; therefore the repository can be scanned to understand the data flow of the assets.

Figure 2A:
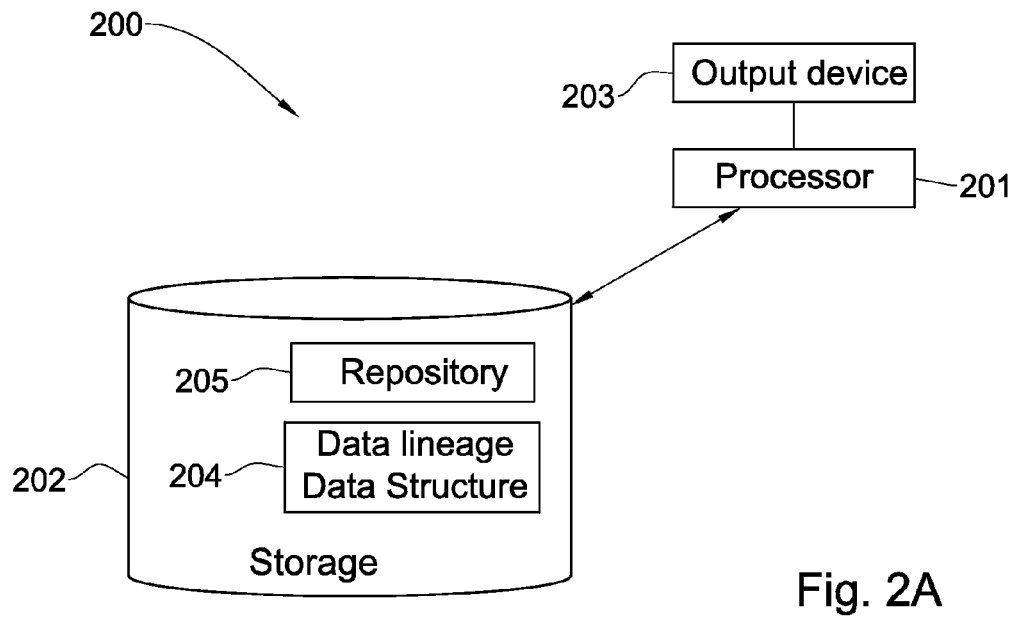
FIGS. 2A-B illustrates a general system architecture, in accordance with certain embodiments of the invention.
Figure 2B:
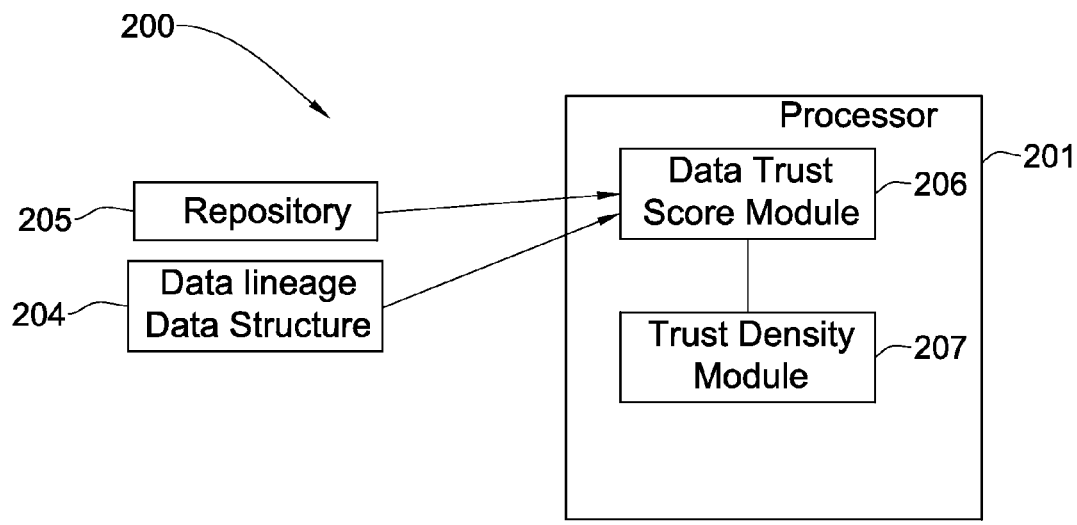

Bearing this in mind, attention is drawn to FIGS. 2A and 2B illustrating a general system architecture 200, in accordance with certain embodiments of the invention. As shown, processor 201 is coupled to storage 202 and to output device 203. The storage, in turn, accommodates data lineage data structure 204 that includes data assets and a repository 205 storing data asset characteristics, all as will be explained in greater detail below.

As will be explained in greater detail below and as shown in FIG. 1B, the processor employs a data trust score module 206 configured to calculate trust scores for data assets (of the data lineage data structure 204) based on characteristics of the data assets (as extracted from repository 205) and trust density module 207 configured to calculate trust density indicative of the reliability score of the report based on the calculated trust scores.

Figure 3:
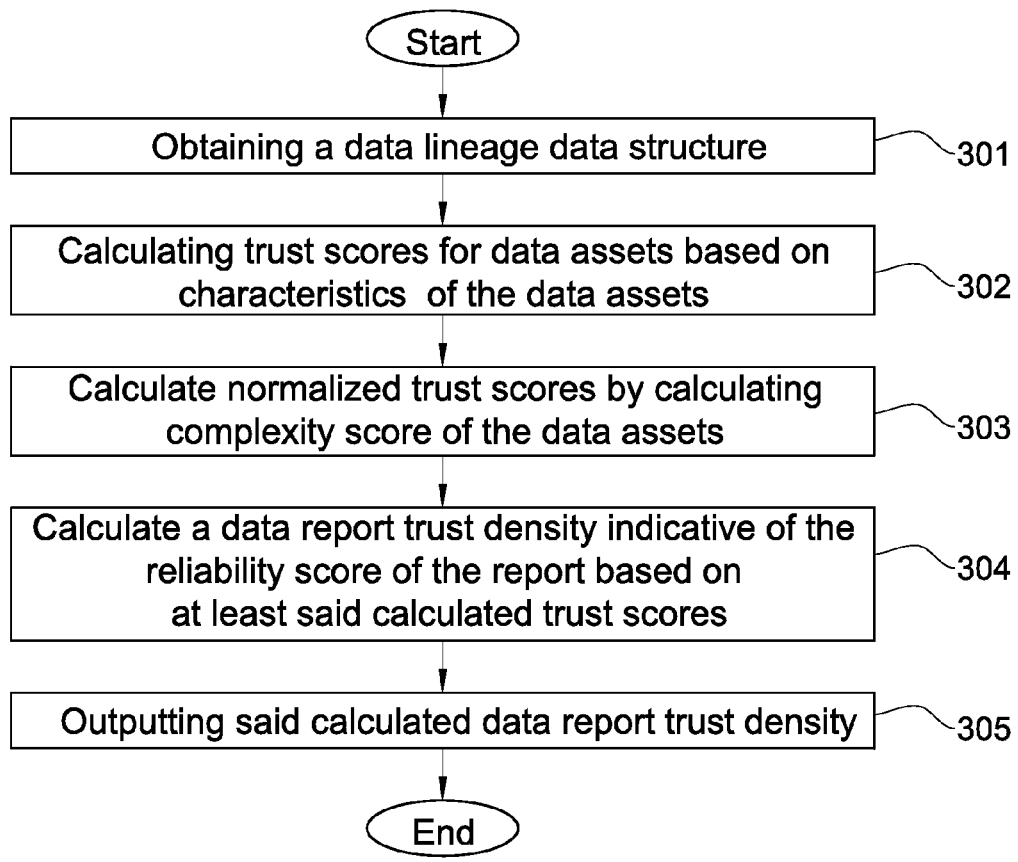
FIG. 3 illustrates a flow chart of a general sequence of operations for calculating data source reliability, in accordance with certain embodiments of the invention.

Attention is now drawn to FIG. 3, showing a flow chart that illustrates a general sequence of operations for calculating report (being an example of Final data source) reliability, in accordance with certain embodiments of the invention. Thus, at step 301 a data lineage data structure is obtained by either being (wholly or partially) generated and/or (wholly or partially) received (i.e. generated externally and stored in storage 202). The processor 201 is configured to calculate trust scores for data assets based on characteristics of the data assets (step 302) where the latter are extracted from data repository 205. Then, in accordance with certain embodiments, the processor is configured to calculate normalized trust scores by calculating the complexity score of the data assets (step 303), and thereafter the processor is configured to calculate a data report trust density indicative of the reliability score of the report, based on at least the calculated trust scores (step 304). Lastly, any known per se output device (203) is configured to output the calculated data report trust density (step 305).

In accordance with certain embodiments, and as will be explained in greater detail below, the data scores are calculated separately for data sources and data routines (being examples of data assets).

In accordance with certain embodiments, many data assets contribute to the data report, either directly or indirectly.

In accordance with certain embodiments the Truth Density of the data report is an aggregate function of the trust scores assigned to each data asset that contributes to the report.

In accordance with certain embodiments, the Truth Density of the data report will be more closely correlated to the trust score of some data assets than to others.

In accordance with certain embodiments the Truth Density of the report under question is calculated (e.g., by Trust Score and Trust Density modules 206 and 207 of processor 201) in accordance, for instance, with equation (I)) (see below) based on the data lineage data structure (e.g., data lineage graph of FIG. 1). The trust score is calculated for each data asset in the lineage graph (falling in a given range, say between 1 and 100). Then, using the weighting calculation (as elaborated below), each data asset in the lineage graph is assigned with a weight that falls in a given range, say between 1 and 100. Then, a weighted average trust score is calculated from all the data assets in the lineage graph, in compliance with the following weighted average equation (I) below:

'n' is the number of items in the data lineage graph $$\frac{\sum_{i=1\,to\,n}(TrustScore_i * Weight_i)}{\sum_{i=1\,to\,n} Weight_i}$$

The Truth Density of the data report (e.g., a BI related report) is the weighted average trust score deduced from the above calculation. If, say, the Truth Density is 100, this indicates that all the items that contributed to the report (e.g., BI report) had a high trust rating and so the data report can be relied upon for business decisions. A lower value will convey to the decision makers that the information in the data report has potential trust issues. By this embodiment, the lower the score, the lower the confidence in the report's quality. Note that the embodiment is not bound by the specified equation, all as will be further discussed below.

Note that in accordance with the latter example the weights represent the complexity of the data assets (whether a data source or data routine).

Figure 4:
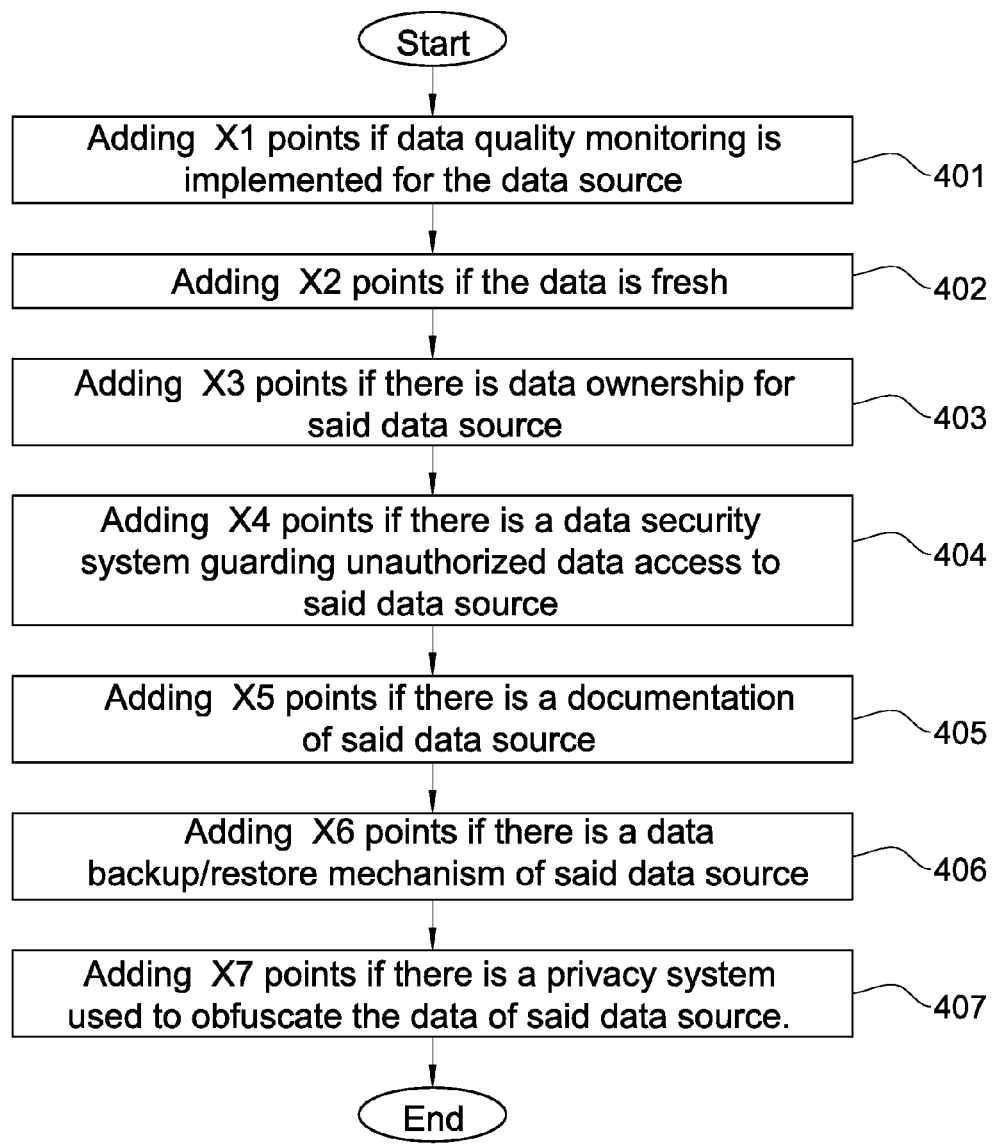
FIG. 4 illustrates a flow chart of a sequence of operations for calculating a trust score for data source, in accordance with certain embodiments of the invention.

Bearing this in mind, attention is drawn to FIG. 4 illustrating a flow chart of a sequence of operations for calculating a trust score for data sources (e.g., in module 206 of processor 201), in accordance with certain embodiments of the invention. The trust score for each data source (say 101 or 103 of FIG. 1) is calculated as follows:

X1 (e.g., 30) points are added (step 401) if data quality monitoring is implemented for the data source. This shows that the data is being tested to see if it conforms to predetermined data rules. Data quality may be calculated by accessing repository 205, e.g., as follows:

a. Is the data source part of an Information Analyzer data quality project—12 points b. Is the data source connected to a data quality governance rule—6 points c. Is the data source connected to a Quality Stage data quality project—12 points X2 (e.g., 20) points are added (step 402) if the data is fresh. Data Freshmen may be calculated by accessing repository 205, e.g., as follows:

a. Did the last run of the ETL job feeding the data source have a success exit code—13 points b. Has the data in the data source been updated in the last week—7 points X3 (e.g., 20) points are added (step 403) if there is data ownership for the data source. If so, it means someone is responsible for the data. Data Ownership may be calculated by accessing repository 205, e.g., as follows:

a. Does the data source have a data steward assigned to it—17 points b. Does the data steward profile include his email and phone contact information—3 points X4 (e.g., 10) points are added (step 404) if there is a data security system guarding unauthorized data access to the data source. If so, it means that the data has not been manipulated in an unauthorized entity. Data Security may be calculated by accessing repository 205, e.g., as follows:

a. Is there a Guardium rule enforcing access to the Data source—7 points b. Is there a Guardium rule monitoring access issues to the Data source—3 points X5 (e.g., 10) points are added (step 405) if there is a documentation of the data source. If so, it means that it is understood in and of itself. Data Documentation may be calculated by accessing repository 205, e.g., as follows:

a. Is the data source implementing a Physical or Logical model—5 points b. Is the data source assigned to a Business Term—5 points X6 points (e.g., 5) are added (step 406) if there is a data backup/restore mechanism of the data source. If so, it means the data is cared about and given attention. Data Backup/Restore may be calculated by accessing repository 205, e.g., as follows:

a. Is there a Backup/Restore routine assigned to the data server—5 points

X7 (e.g., 5) points are added (step 407) if there is a privacy system used to obfuscate the data of the data source. If so, this means that the data is cared about and given attention. Data Privacy may be calculated by accessing repository 205, e.g., as follows:

a. Is there an Optim masking routine assigned to the data source—5 points

In accordance with certain embodiments, the specified characteristics are determined by accessing the data repository 205.

By this particular embodiment the following data source characteristics are used: data quality, freshness of data, data ownership, data security, documentation of data, data backup/restore mechanism and data privacy. Those versed in the art will readily appreciate that the embodiments are not bound by the specified list of data source characteristics and accordingly in accordance with certain embodiments, one or more of the specified characteristics may be deleted and/or modified and/or other(s) may be added. Thus, in accordance with certain embodiments, one or more of the following characteristics may be utilized when calculating a trust score of data source: Quality of the predecessor in lineage graph, Rank/Trustworthiness/Track record of the data steward, Was it created using the modeling process of "spec->logical model->physical model->implementation model" Standards compliance of the data source. The embodiments are, of course, not bound by these examples.

The embodiments are by no means bound by contributing to the score by adding points and accordingly in accordance with certain embodiments other forms of contribution to the trust scores may be utilized e.g., utilizing operators other than 'add'. Also the specified point values and the ratio between the respective data characteristics may vary depending upon the particular application.

Thus, in accordance with certain embodiments other operator may be used, e.g., "subtract". Thus, for example, when calculating a Trust Score to a Data Source, if the data is read by a data routine that then writes the data to a publicly available location, the source data loses trust and points, and accordingly points may be subtracted. In accordance with another non-limiting example, if the data is stored on a machine that has had more than X % (say 10) downtime due to hardware malfunction the data loses trust, and points are subtracted.

Figure 5:
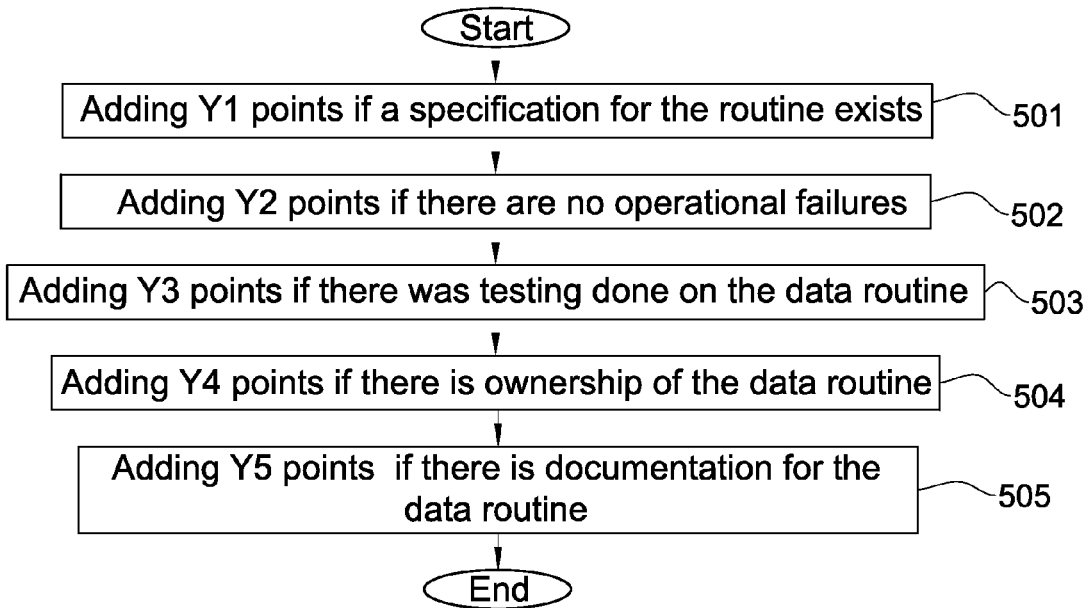
FIG. 5 illustrates a flow chart of a sequence of operations for calculating trust score for data routine, in accordance with certain embodiments of the invention.

Turning now to FIG. 5, it shows a flow chart illustrating a sequence of operations for calculating a trust score for data routines (e.g., in module 206 of processor 201), in accordance with certain embodiments of the invention. The trust score for each data routine (say 106 or 108 of FIG. 1) is calculated as follows:

$Y1$ (e.g., 30) points are added (step 501) if a specification for the routine exists. Specification may be calculated by accessing repository 205, e.g., as follows:
    a. Is there a FastTrack mapping spec assigned to the data routine—12 points
    b. Is there a Blueprint assigned to the data routine—8 points
    c. Is there a Business Term assigned to the data routine—5 points
    d. Is there an Information Governance Rule assigned to the data routine—5 points $Y2$ (e.g., 25) points are added (step 502) if there are no operational failures. Operational failures may be calculated by accessing repository 205, e.g., as follows:
    a. Do the last 5 runs of the data routine have a success exit code—15 points
    b. Do the last 5 runs of the data routine have less than 10% data errors—10 points $Y3$ (e.g., 20) points are added (step 503) if there was testing done on the data routine. If so, it means someone is responsible for the data. Testing may be calculated by accessing repository 205, e.g., as follows:
    Was the data routine promoted to the production environment directly from a testing environment—20 points $Y4$ (e.g., 15) points are added (step 504) if there is ownership of the data routine. If so, it means someone is responsible for it. Ownership may be calculated by accessing repository 205, e.g., as follows:
    a. Does the data source have a data steward assigned to it—12 points
    b. Do the data steward details include his email and phone contact information—3 points $Y5$ points (e.g., 10) are added (step 505) if there is documentation for the data routine. If so, it means that it is understood in and of itself. Documentation may be calculated by accessing repository 205, e.g., as follows:
    a. Is this routine implementing an Information Governance Rule—10 points In accordance with certain embodiments, the specified characteristics are determined by accessing the data repository 205.

By this particular embodiment the following data routine characteristics are used: specification, operational failures, testing, data ownership and documentation. Those versed in the art will readily appreciate that the embodiments are not bound by the specified list of data routine characteristics and accordingly in accordance with certain embodiments, one or more of the specified characteristics may be deleted and/or modified and/or other(s) may be added. Thus, in accordance with certain embodiments, one or more of the following characteristics may be utilized when calculating a trust score of data routine: the developers level of training, experience and certification, Is the routine code stored in a source control mechanism, etc. The embodiments are, of course, not bound by these examples.

The embodiments are by no means bound by contributing to the score by adding points and accordingly in accordance with certain embodiments other forms of contribution to the scores may be utilized e.g., utilizing operators other than add, e.g., subtract. Also the specified point values and the ratio between the respective data characteristics points may vary depending upon the particular application.

In accordance with certain embodiments, a low trust score may or may not be a sign of a trust issue:

Low trust score is not a sign of a trust issue:

Consider a data routine that extracts data from a warehouse and puts it in a file for the purpose of loading a data mart. The extract job does not transform the data in any way; it is what is known as a "lift and shift" job. Because the job is not complex and less prone to human error, the low score is not necessarily a sign of a potential trust issue.

Low trust score is a sign of a trust issue:

Consider a data routine that extracts data from many data sources, cross correlates the data from each source, transforms the data, aggregates it and then writes it to a table in the data warehouse. Because the job is complex and more prone to human error, a low trust score for this data routine or for the target table may indicate that there is a potential data quality issue.

In accordance with certain embodiments, the weighting of a data routine is a function of the complexity of the routine and the weighting of a data source is a function of the complexity of the data routines that write to the data source.

Figure 6:
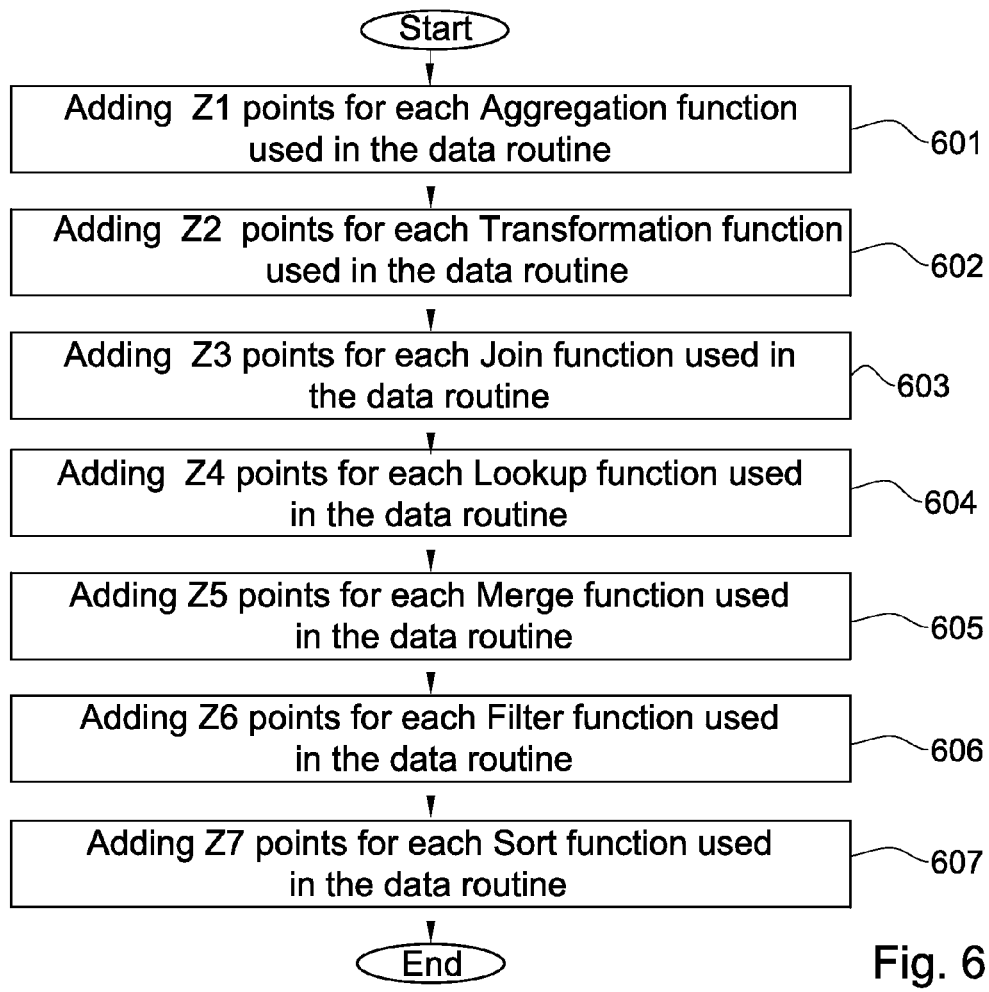
FIG. 6 illustrates a flow chart of a sequence of operations for calculating complexity score of data routine, in accordance with certain embodiments of the invention.

Attention is now drawn to FIG. 6 illustrating a flow chart of a sequence of operations for calculating a complexity score of a data routine (e.g., in module 206 of processor 201), in accordance with certain embodiments of the invention.

Thus, in accordance with certain embodiments, every data routine in the data lineage result is assigned a complexity score between 0 and 100, the score being aggregated from the following data functions:

$Z1$ (e.g.) 25 points are added (step 601) for each Aggregation function used in the data routine;

$Z2$ (e.g., 10) points are added (step 602) for each Transformation function used in the data routine;

$Z3$ (e.g., 10) 10 points are added (step 603) for each Join function used in the data routine;

$Z4$ (e.g., 10) points are added (step 604) for each Lookup function used in the data routine;

$Z5$ (e.g., 10) 10 points are added (step 605) for each Merge function used in the data routine;

$Z6$ (e.g., 5) points are added (step 606) for each Filter function used in the data routine; and $Z7$ (e.g., 5) 5 points are added (step 607) for each Sort function used in the data routine.

In accordance with certain embodiments, once a data routine has reached a complexity score of 100 it is considered prone to human error and a low trust score would impact the overall trust density of the final report. Because of this, in accordance with certain embodiments, all scores of 100 and over are all considered high risk and impact the final aggregate trustworthiness in an equivalent way.

Note that in accordance with certain embodiments, the weight of a Data Routine is the complexity score assigned to the routine and the weight of a Data Source is the maximum complexity score assigned to all the routines that write to the data source.

Figure 7:
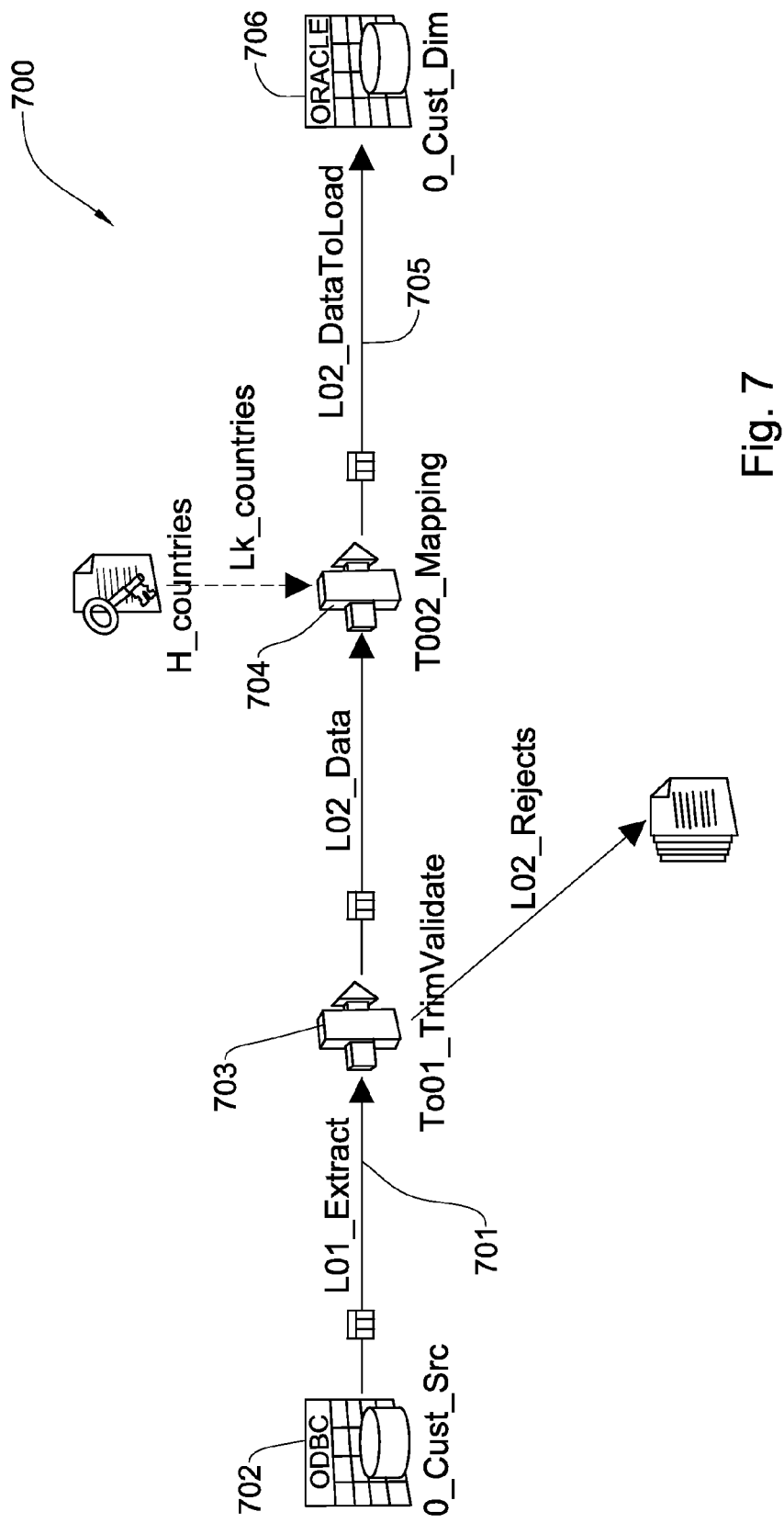
FIG. 7 illustrates schematically a job, being an example of a data routine, used in a system in accordance with certain embodiments of the invention.

By this particular embodiment the complexity is based on the following functions: Aggregation function, Transformation function, Join function, Lookup function, Merge function, Filter function and Sort function. Those versed in the art will readily appreciate that the embodiments are not bound by the specified list complexity functions and, accordingly, in accordance with certain embodiments, one or more of the specified functions may be deleted and/or modified and/or other(s) may be added and or parameters other than functions, such as structure. An example of the latter is shown in FIG. 7 which illustrates a job 700 (data routine) that includes extraction of data 701 from an ODBC data source 702 and validation 703 followed by mapping 704 and loading 705 onto Oracle database 706. The complexity level of the specified routine 700 is higher than, for instance, a job (routine) having a simpler structure e.g., designated to only extract data from a first data source and store it in a second data source. The embodiments are of course not bound by the specified examples of data routine.

The embodiments are by no means bound by contributing to the score by adding points and accordingly in accordance with certain embodiments other forms of contributions to the scores may be utilized e.g., utilizing operators other than 'add' (e.g., subtract). Also the specified point values and the ratio between the respective data characteristics points may vary depending upon the particular application. In accordance with certain embodiments, using the data source trust scores, data routine trust scores and the data complexity (as reflected in the weighting) in the specified equation (I), yields the calculated truth density of the final report. The embodiments are however not bound by this example.

Reverting to FIG. 6, there follows, in accordance with certain embodiments, a non-limiting modification calculating the complexity of the data assets based also on the order of the functions. For example, in the list above the aggregation and transformation functions each add 25 points to the complexity score (steps 601 and 602). However, an aggregation after a transformation is more complex than an aggregation of plain data that is not transformed. Thus, by this embodiment, the real complexity of a function is a function of the points defined above as well as the aggregate complexity of the functions preceding the function in question.

Accordingly, in accordance with certain embodiments, the sequence of operations described with reference to FIG. 6 is modified as follows:

localScore is the points attributed to the function as exemplified in FIG. 6 above;

subTotal is the current aggregate complexity score of all the functions preceding the function in question;

The actual complexity score of the function is calculated using the following exemplary equation (II):

$$localScore * \left(1 + \frac{subTotal}{200}\right)$$

The specified modification ensures that the localScore is augmented based on the complexity of the functions preceding the current function.

The embodiments are not bound by the specific values and operators of equation (II) and accordingly other values and/or operators and/or equations may be used for taking into consideration also the order of the functions (being an example of data characteristics).

The embodiments are not bound by the modification that is applied to the calculation of a complexity score and accordingly other modifications are applicable calculating the complexity of data assets by taking into account the complexity of the entire lineage data structure, where the more complex the lineage data structure (e.g., in the case of graph: one or more of the following: more nodes, links, loops) the lesser the reliability of the resulting truth density score.

In accordance with certain other embodiments, each function type would add to the complexity by a different measure, e.g., a Pivot function is simple and would have a low complexity score. A Standardize function is complex and would have a high complexity score.

Other modifications may be applied to the calculation of complexity score and/or the data assets (e.g., either or both of the data source and data routine). Thus, in accordance with certain embodiments another non limiting manner of calculating trust density (in a modified manner than that exemplified with reference to equation (i)), includes: a node with a low trust score impacts the final truth density in correlation to where the node is located in the lineage graph. If the node is further from the final report the impact is greater than if the node directly precedes the report. This is so since this low quality data will have more chances of being incorrectly manipulated when it is further from the final report. The embodiments are not bound by this particular modification. In accordance with another non limiting example, the range of scores and the range of weights are examined before applying the weight to the score.

Note also that while in the description, the provision (e.g., generation) of lineage graph and calculating the reliability of the final data source are described as two distinct stages. Those versed in the art will readily appreciate that the calculation stage may be performed while the data lineage is generated and not necessarily after the generation thereof is finalized.

Thus, for instance, when describing a provision of data structure indicative of a data lineage and a processor configured to calculate at least trust scores for data assets and a final data source trust density score, this may include applying the calculation while generating the data structure.

Having calculated the truth density (e.g., by following the specified equation (I), the truth density may be outputted (e.g., through output device 23 of FIG. 2A and will be conveyed to the decision maker reading the report. Using this, he/she will ascertain whether the report information needs to be used with caution, or to what extent it can be relied upon.

For a better understanding of the complexity, attention is drawn to FIGS. 8A-B which illustrate two respective scenarios of data report reliability calculations. Thus, with reference to FIG. 8A, assuming that the Trust scores and Weights for the data assets (as calculated e.g., in accordance with the low charts of FIGS. 4-6 above) are: "Sales Data entity Console" (801) (90,10), "Daily Sales Holding Table" (802) (90, 10), "Aggregate Sale Job" (803) (60, 25), and "Sales Warehouse Table" (804), are) (60, 25), respectively, then applying Equation (I) yields a Trust Density score 68.6 for the Quantity Sales Report (805).

Turning now to FIG. 8B, it depicts a similar scenario with the minor modification that data assets i.e., jobs 803 and 804 are more complex as reflected in their respective weights 50 (compared to 25 in FIG. 8A). This results in lower Truth Density score of 65.0 of the report 805. The reason is that the more complex jobs 803 and 804 (which have identical trust scores (60) to those of the jobs 803 and 804 of FIG. 8A) reduced the reliability of the overall report, since the more complex jobs rendered the overall report more error prone.

Those versed in the art will readily appreciate that in accordance with certain embodiments of the invention, through an automated process, a Truth Density score will be attributed to a (e.g., BI) report, thereby (among others) saving an enterprise many thousands of man-hours.

Any of the modules in FIGS. 2A-B may be made up of any combination of software, hardware and/or firmware that performs the functions as described and explained herein. In various cases, system 200 may be centralized in one location or dispersed over more than one location.

Alternatively to the example shown in FIG. 2A, system 200 may in some examples include fewer, more and/or different modules than shown in FIGS. 2A-B. Alternatively to the example shown in FIGS. 2A-B, the functionality of system 200 may in some examples be divided differently among the modules illustrated in FIGS. 2A-B. Alternatively to the example shown in FIGS. 2A-B, the functionality of system 200 described herein may in some examples be divided into fewer, more and/or different modules than shown in FIGS. 2A-B and/or system 200 may in some examples include additional, less, and/or different functionality than described herein.

Alternatively to the examples shown in FIG. 3, stages which are shown in FIG. 3 as being executed sequentially may in some other examples be executed in parallel and/or stages shown in FIG. 3 as being executed in parallel may in some other examples be executed sequentially. Alternatively to the example shown in FIG. 3 the method may in some other examples include more, fewer and/or different stages than illustrated in FIG. 3. Alternatively to the example shown in FIG. 3, stages may in some other examples be executed in a different order than illustrated in FIG. 3.

Alternatively to the examples shown in FIG. 4, stages which are shown in FIG. 4 as being executed sequentially may in some other examples be executed in parallel and/or stages shown in FIG. 4 as being executed in parallel may in some other examples be executed sequentially. Alternatively to the example shown in FIG. 4 the method may in some other examples include more, fewer and/or different stages than illustrated in FIG. 4. Alternatively to the example shown in FIG. 4, stages may in some other examples be executed in a different order than illustrated in FIG. 4.

Alternatively to the examples shown in FIG. 5, stages which are shown in FIG. 5 as being executed sequentially may in some other examples be executed in parallel and/or stages shown in FIG. 5 as being executed in parallel may in some other examples be executed sequentially. Alternatively to the example shown in FIG. 5 the method may in some other examples include more, fewer and/or different stages than illustrated in FIG. 5. Alternatively to the example shown in FIG. 5 stages may in some other examples be executed in a different order than illustrated in FIG. 5.

Alternatively to the examples shown in FIG. 6, stages which are shown in FIG. 6 as being executed sequentially may in some other examples be executed in parallel and/or stages shown in FIG. 6 as being executed in parallel may in some other examples be executed sequentially. Alternatively to the example shown in FIG. 6 the method may in some other examples include more, fewer and/or different stages than illustrated in FIG. 6. Alternatively to the example shown in FIG. 6, stages may in some other examples be executed in a different order than illustrated in FIG. 6.

The term processor should be expansively construed to include any kind of one or more electronic processors with data processing capabilities and which is made up of any combination of hardware, software and/or firmware and which includes at least some hardware, even if not labeled as such in the disclosure.

It will also be understood that the system according to the presently disclosed subject matter can be implemented, at least partly, as a suitably programmed processor. Likewise, the presently disclosed subject matter contemplates a computer program being readable by a computer (processor) for executing the disclosed method. The presently disclosed subject matter further contemplates a non-transitory machine-readable memory tangibly embodying a program of instructions executable by the machine for executing the disclosed method.

While various embodiments have been shown and described, it will be understood that there is no intent to limit the embodiments by such disclosure, but rather, it is intended to cover all modifications and alternate constructions falling within the scope of the embodiments, as defined in the appended claims.

The invention claimed is:

1. A computer implemented system for automatically determining a reliability score of a final destination, comprising:

data structure indicative of a data lineage- that includes a plurality of data assets, the data assets comprising data sources and data routines, wherein data is transferred and processed among the data sources via corresponding data routines and the processed data flows into a final destination;

a processor configured to calculate at least:

trust scores for each of the data assets based on characteristics of the data assets; and a final destination trust density score indicative of the reliability score of the final destination based on at least the calculated trust scores; and an output device configured to output the calculated final destination trust density score;

wherein the processor is configured to calculate the final destination trust density score by:

$$\frac{\sum_{i=1 \text{ to } n} (TrustScore_i * Weight_i)}{\sum_{i=1 \text{ to } n} Weight_i};$$

wherein the $TrustScore_i$ comprises the trust score of either of the data source or data routine, and wherein the $Weight_i$ of the data routine is the complexity score assigned to the data routine, and wherein the $Weight_i$ of the data source is is the maximum complexity score assigned to all the data routines that write to the respective data source.

2. The system according to claim 1, wherein the calculating the final destination trust density score is further based on at least the complexity of the data assets and wherein the complexity is dependent on at least the structure or function of each of the data assets.

3. The system according to claim 1, wherein the data lineage is represented as a data lineage graph.

4. The system according to claim 1, wherein the data traverses through the data structure between the data sources and corresponding data routines as defined by the data lineage.

5. The system according to claim 4, wherein each of the data sources comprise at least one of: an OLAP layer, a data mart, a data warehouse, a staging database, an intermediate file, and an operational data store.

6. The system according to claim 4, wherein each of the data routines comprises at least one of: a file transfer process and an Extract Transform and Load (ETL) process.

7. The system according to claim 1, wherein the processor is configured to calculate the trust scores of the data sources based on data quality of the respective data sources.

8. The system according to claim 1, wherein the processor is configured to calculate the trust scores of the data routines based on data quality of the respective data routines.

9. The system according to claim 4, wherein the processor is configured to calculate the final destination trust density score further based on at least respective complexity scores of the data sources and data routines, wherein the complexity scores are dependent on at least the structure or function of the data sources and the data routines.

10. The system according to claim 1, wherein the processor is configured to calculate the trust score of each data source, based on the data characteristics, including:
   adding X1 points if data quality monitoring is implemented for the data source;
   adding X2 points if the data is fresh;
   adding X3 points if there is data ownership for the data source;
   adding X4 points if there is a data security system guarding unauthorized data access to the data source;
   adding X5 points if there is a documentation of the data source;
   adding X6 points if there is a data backup/restore mechanism of the data source; and
   adding X7 points if there is a privacy system used to obfuscate the data of the data source,
   wherein any of the X1 to X7 points fall within a given points range.

11. The system according to claim 1, wherein the processor is configured to calculate the trust score of each data routine based on the data characteristics, including:
   adding Y1 points if a specification for the routine exists;
   adding Y2 points if there are no operational failures;
   adding Y3 points if there was testing done on the data routine;
   adding Y4 points if there is ownership of the data routine; and
   adding Y5 points if there is a documentation for the data routine, wherein any of the Y1 to Y5 points fall within a given points range.

12. The system according to claim 1, wherein the processor is configured to calculate the complexity score of each data routine, including:
   adding Z1 points for each Aggregation function used in the data routine;
   adding Z2 points for each Transformation function used in the data routine;
   adding Z3 points for each Join function used in the data routine;
   adding Z4 points for each Lookup function used in the data routine;
   adding Z5 points for each Merge function used in the data routine;
   adding Z6 points for each Filter function used in the data routine; and
   adding Z7 points for each Sort function used in the data routine,
   wherein any of the Z1 to Z7 points fall within a given points range.

13. The system according to claim 12, wherein the processor is configured to calculate for each one of the functions in compliance with the following equation $$localScore * \left(1 + \frac{subTotal}{200}\right)$$

wherein localScore are the points added to the respective function, and
subTotal is the aggregate complexity score of all the functions preceding the respective function.

14. The system according to claim 12, wherein the processor is configured to calculate the complexity score based also on complexity of the data lineage such that the more the data sources the more the points, and the more the data routines the more the points.

15. The system according to claim 1, wherein the final destination is a Business Intelligence (BI) related report.

16. A computer implemented method for automatically determining a reliability score of a final destination, comprising:
   providing a data structure indicative of a data lineage that includes a plurality of data assets, the data assets comprising data sources and data routines, wherein data is transferred and processed among the data sources via corresponding data routines and the processed data flows into a final destination;
   calculating trust scores for each of the data assets based on characteristics of the data assets;
   calculating a final destination trust density score indicative of the reliability score of the final destination based on at least the calculated trust scores; and
   outputting to an output device the calculated final destination trust density score;
   wherein the method comprises calculating the final destination trust density score by:

$$\frac{\sum_{i=1\,to\,n} (TrustScore_i * Weight_i)}{\sum_{i=1\,to\,n} Weight_i}$$

wherein the TrustScore$_i$ comprises the trust score of either of the data source or data routine, and wherein the Weight$_i$ of the data routine is the complexity score assigned to the data routine, and wherein the Weight$_i$ of the data source is is the maximum complexity score assigned to all the data routines that write to the respective data source.

17. A computer program product that includes a computer readable medium embodying a computer program, comprising:
   computer code portion for providing a data structure indicative of a data lineage that includes a plurality of data assets, the data assets comprising data sources and data routines, wherein data is transferred and processed among the data sources via corresponding data routines, and the processed data flows into a final data destination;

computer code portion for calculating trust scores for each of the data assets based on characteristics of the data assets;

computer code portion for calculating a final destination trust density score indicative of the reliability score of the final destination based on at least the calculated trust scores; and computer code portion for outputting to an output device the calculated final destination trust density score;

wherein a computer code portion calculates the final destination trust density score by:

$$\frac{\sum_{i=1 \text{ to } n}(TrustScore_i * Weight_j)}{\sum_{i=1 \text{ to } n} Weight_j}$$

the $TrustScore_i$ comprises the trust score of either of the data source or data routine, and wherein the $Weight_j$ of the data routine is the complexity score assigned to the data routine, and wherein the $Weight_j$ of the data source is the maximum complexity score assigned to all the data routines that write to the respective data source.

* * * * *